July 3, 1951  R. KURZWEIL  2,559,360
MACHINE TOOL
Filed Jan. 12, 1946  3 Sheets-Sheet 1

INVENTOR
Robert Kurzweil
BY
J.B. Felshin
ATTORNEY

July 3, 1951 R. KURZWEIL 2,559,360
MACHINE TOOL
Filed Jan. 12, 1946 3 Sheets-Sheet 2

INVENTOR
Robert Kurzweil
BY
J.B. Feeelin
ATTORNEY

Patented July 3, 1951

2,559,360

UNITED STATES PATENT OFFICE 2,559,360

MACHINE TOOL

Robert Kurzweil, Kew Gardens, N. Y., assignor to Morey Machinery Co., Inc., New York, N. Y., a corporation Application January 12, 1946, Serial No. 640,914

9 Claims. (Cl. 29—90)

This invention relates to machine tools. It is particularly directed to a lathe for truing and burnishing a work piece. More particularly it relates to a machine for turning worn railroad axles and burnishing the journals.

An object of this invention is to provide a machine of the character described provided with means to support a work piece for rotation, and a pair of cross slides mounted on the bed of the machine, one in front and one in back of the work piece, each of the cross slides carrying a tool and hydraulic means for simultaneously moving said tools into contact with the work piece.

Another object of this invention is to provide a lathe of the character described in which one of the cross slides is provided with a hydraulic cylinder, the piston within the cylinder being connected to the other cross slide so that when pressure is applied in the cylinder on one side of the piston, the tools are pressed toward opposite sides of the work piece thereby compensating for different diameters of the work piece, without any previous adjustment. By applying pressure on the cylinder to the opposite side of the piston, the two cross slides move away from each other for moving the tools away from the work piece.

Still another object of this invention is to provide a construction of the character described in which on one of the cross slides is a pivoted tool holder carrying a burnishing rod at one end and a turning tool at its other end, and on the other is a burnishing rod, so that when the cross slides are moved together, the burnishing rods contact the work piece and when the cross slides are moved apart from one another, the pivoted tool holder may be turned about its axis to bring the turning tool toward the work piece.

Yet a further object of this invention is to provide a machine of the character described, means to apply a cross feed to the turning tool by means of a hand wheel and including a nut on a screw which is part of the interconnecting piston rod, the latter being prevented from turning in relation to the carriage by a suitable key, the construction being such, furthermore, that by turning the nut connected to the handwheel at the front of the machine, the front slide can be moved crosswise for the turning operation without changing the position of the rear slide.

Yet a further object of this invention is to provide a machine of the character described in which the front slide may be moved in and out for the turning operations, but it is not necessary to return the front slide to its starting position, because the floating arrangement of the hydraulic cylinder automatically compensates for any relative change in position between the front and rear slides.

A still further object of this invention is to provide a strong, rugged and durable machine of the character described which may be employed for a variety of uses, and which shall be sure and positive in operation, relatively inexpensive to manufacture, and yet practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown various possible illustrative embodiments of this invention, Fig. 1 is a front elevational view of a machine embodying the invention, with parts broken away and in cross-section;

Figure 1:
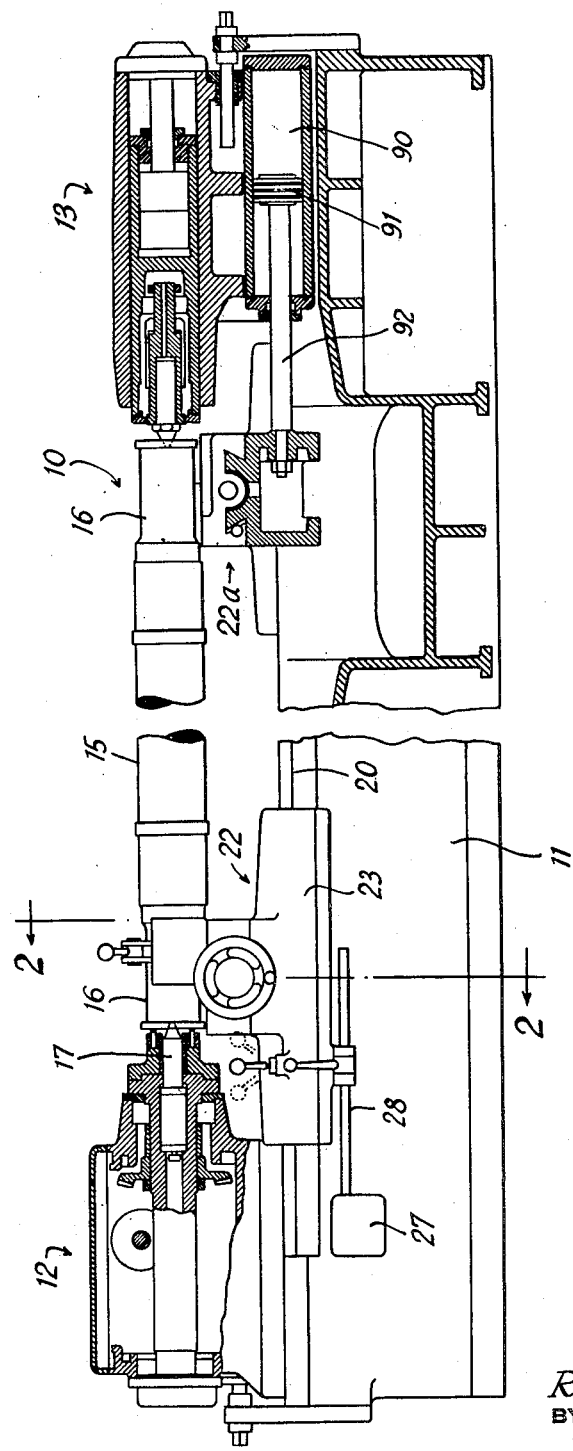

Referring now in detail to the drawing, 10 designates a machine embodying the invention, here shown in the form of a lathe. The lathe comprises a bed 11, a headstock 12, and a tailstock 13. Supported on and between the headstock and tailstock is a work piece 15, here shown for the purpose of illustration, in the form of a railroad axle provided with journals 16. The headstock and tailstock may be of any suitable construction. They may be constructed as shown and described in application Serial No. 627,984, filed jointly on November 13, 1945, by Juventino Jose Pesqueira and applicant, and now Patent No. 2,545,858, granted March 20, 1951.

The headstock is thus provided with a live center 17 engaging one end of the axle. The headstock is fixed relative to the bed. The bed 11 is provided at the end thereof adjacent the headstock with a front longitudinal guide 20 and a rear longitudinal guide 21. The front guide 20 has a front surface 20a, an undersurface 20b, an upwardly inclined surface 20c, and a rear downwardly inclined surface 20d. The rear guide 21 has an upper horizontal surface 21a, a rear vertical surface 21b, and a horizontal undersurface 21c. Slidably mounted on the bed for longitudinal movement, adjacent the headstock end of the lathe, is a carriage 22. Said carriage 22 has a front portion 23, engaging the guide 20, and a rear portion 24 engaging the guide 21. The portion 23 is provided with surfaces or portions contacting surfaces 20a, 20b, 20c of guide 20, whereas the rear portion 24 has surfaces contacting surfaces 21a, 21b, and 21c of guide 21. The carriage 22 is provided with an interconnecting portion 25 which interconnects the front and rear portions 23 and 24 and which passes beneath the axle 15 and is disposed transversely of the bed 11.

The carriage 22 may be moved longitudinally, hydraulically, for example by means of a cylinder 27 on the bed operating a piston rod 28 connected in any suitable manner to the carriage.

Slidably mounted on the carriage for movement in a horizontal direction perpendicular to the direction of movement of the carriage is a front cross slide 30, and a rear cross slide 31 aligned therewith. The axle is between the cross slides. The carriage 22 is provided at the rear end thereof with an upwardly projecting portion 32 formed, for the purpose hereinafter appearing, with a horizontal through opening 33 extending from front to rear. The cross slide 31 is provided at its front end with a portion 35 disposed in front of portion 32 and formed with a through opening 36 aligned with opening 33. Mounted on the slide 31 for rotation is a burnishing wheel 37 having a horizontal axis parallel to and at the level of the axis of the work piece 15. The burnishing wheel 37 is adapted to contact the rear side of the journal 16 adjacent the headstock.

Attached to the rear side of slide 31 is a horizontal hydraulic cylinder 40, the axis whereof is perpendicular to the bed. Cylinder 40 is provided with a front wall 41 and is closed by a rear cap 42. The front wall 41 is formed with a through opening 43 co-axial with openings 33 and 36. Slidably extending through the openings 36 and 33 is an elongated rod 45, keyed to portion 32 of the carriage against rotation by a key 46. Screwed to the rear end of rod 45, as at 48, is a piston rod 49 passing through an opening 43 and carrying a piston 50 within the cylinder 40. Wall 41 of the cylinder is provided with a port 51 communicating with one side of piston 50. The cylinder is also formed with a port 52 communicating with the opposite side of the piston 50. Conduits 51a and 52a connected to the ports 51, 52 serve to supply hydraulic medium under pressure to the cylinder for the purpose hereinafter appearing.

The front cross slide 30 is provided with a through opening 60 through which the rod 45 extends. Said cross slide is furthermore formed with a recess 61 in which is rotatably and non-slidably received a nut 62. The nut 62 has internal screw threads 63 meshing with a screw threaded portion 64 on the rod 45. The nut 62 projects from the slide and fixed to the projecting end thereof is a hand wheel 66 provided with a handle 67. It will now be understood that upon turning of the hand wheel, the front slide 30 will move longitudinally relative to the rod 45.

On front slide 30 is a vertical post 70. Pivoted on the post 70 is a tool holder 71. The tool holder 71 carries at one end a rotary burnishing wheel 72 mounted for rotation in any suitable manner, about a horizontal axis at the level of the axis of the burnishing wheel 37. The wheels 37 and 72 are adapted to contact opposite sides of the journal 16 adjacent the headstock.

At the opposite side of the tool holder 71 is a turning tool 74. The tool holder 71 may be rotated about the tool post 70, and may furthermore be clamped in operating position by means of a suitable brake operated by handle 75.

Figure 2:
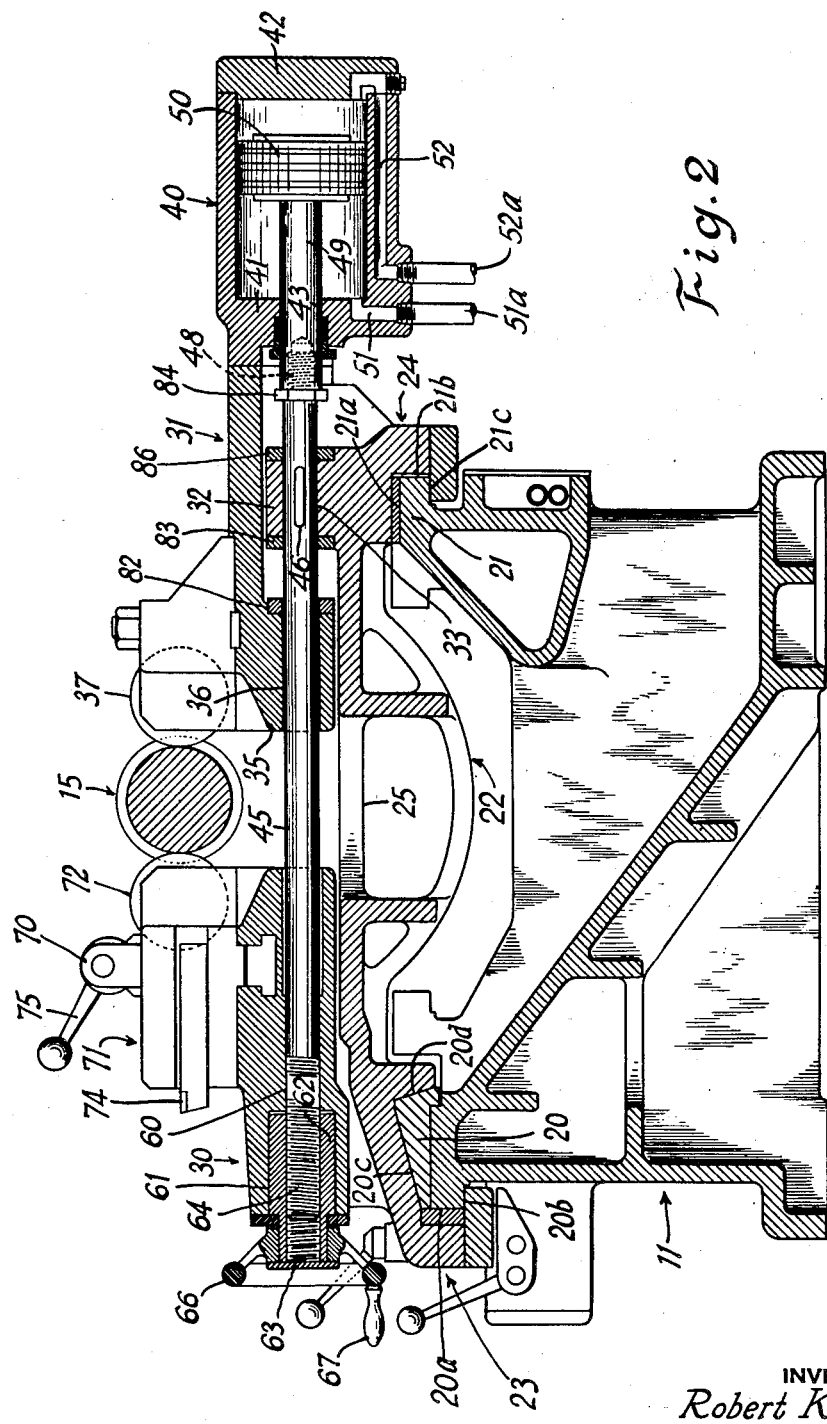
Fig. 2 is a cross-sectional view taken on line 2—2 of Fig. 1.

The operation of the device will now be understood. In Fig. 2 the machine is shown in burnishing position. Hydraulic medium under pressure has entered port 51 by any suitable control means, for example a handle 80 at the front of the machine. The piston 50 is thus moved to the right and cylinder 40 is moved to the left. The piston carries the front slide toward one side of the work piece 15, and the cylinder 40 being attached to the rear slide, carries the rear slide toward the opposite side of the work piece. The burnishing wheels 37 and 72 are thus pressed against opposite sides of the work piece. A floating arrangement is obtained, and no adjustment is necessary, as the hydraulic pressure will always press the burnishing wheels against the work piece. The arrangement is such that hydraulic pressure is applied through the two cross slides directly to the burnishing rollers and the whole unit consisting of the two cross slides and the cylinder floats on the carriage.

By applying pressure to one side of the cylinder, the burnishing rollers are pressed toward the axle. This arrangement automatically compensates for different diameters to be burnished without any previous adjustment.

When pressure is applied through the port 52, the two cross slides move away from the center until the movement is stopped against the carriage. A hardened abutment piece 82 may be attached to the rear side of the portion 35 of the rear cross slide. Another abutment piece 83 is attached to the front side of portion 32 of the carriage. The abutment piece 82 will contact the abutment piece 83 when the rear slide moves rearwardly.

Figure 3:
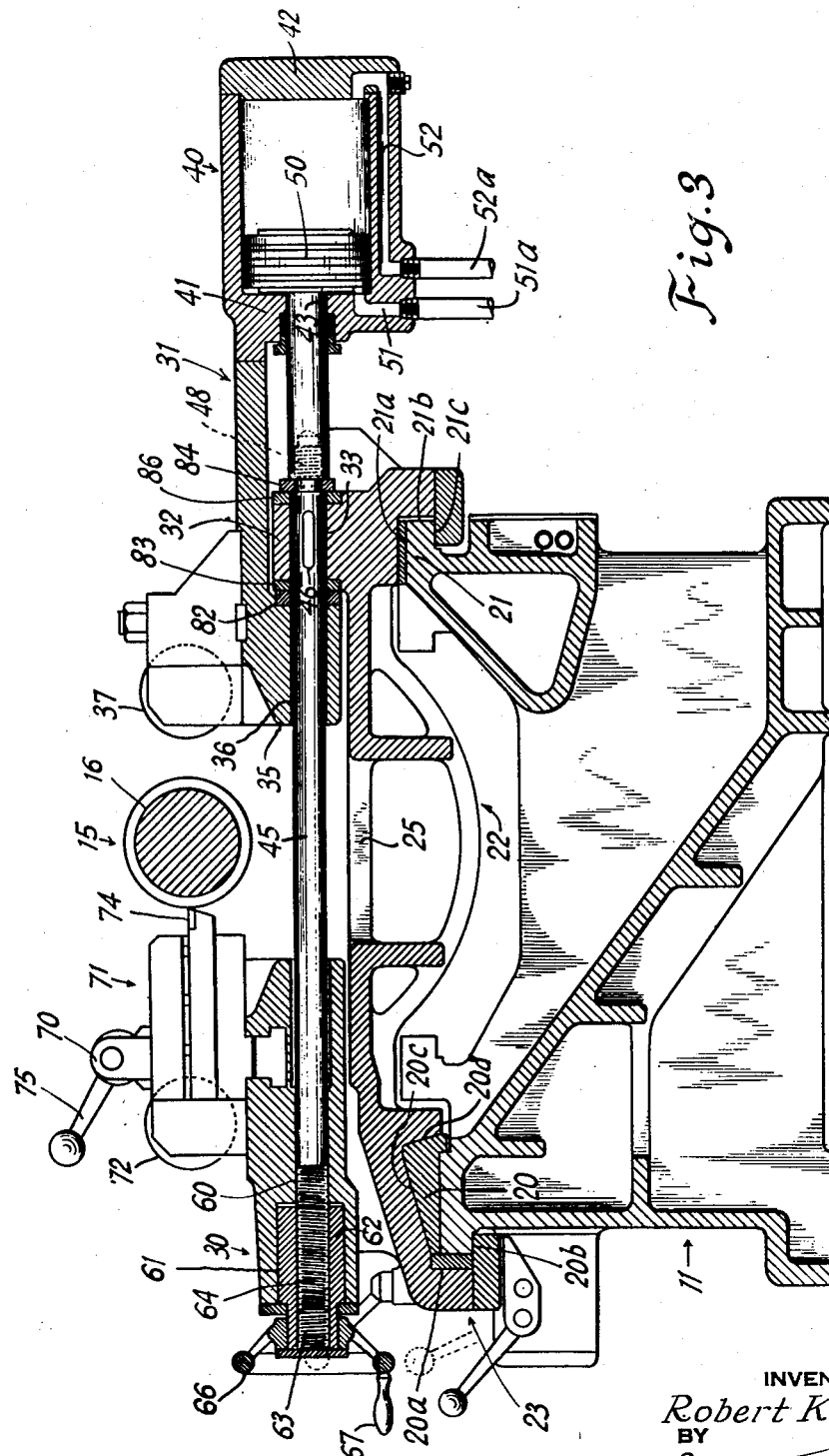
Fig. 3 is a view similar to Fig. 1, but showing the machine in turning position.

When the piston 50 moves forwardly, a collar 84 on the rod 45 will contact a hardened abutment plate 86 on the rear side of portion 32 of the carriage. When the cross slides move apart, they are locked in place by hydraulic pressure. The tool holder may then be released for turning movement on the post 70. Said tool holder may then be rotated through 180° to bring the turning tool 74 toward the axle as shown in Fig. 3. Hand wheel 66 may then be rotated for moving the front cross slide on rod 45 for turning the work piece.

The piston rod is prevented from turning in relation to the carriage by means of the key 46. The piston screw or rod 45 is stationary during the turning operation by reason of the fact that it is prevented from turning by the key 46, and also because the hardened abutment plate 82 contacts plate 83 and the collar 84 contacts plate 86 as shown in Fig. 3 of the drawing. By turning the nut connected with the hand wheel 66 in front of the machine, the front slide can be moved crosswise for the turning operation without changing the position of the carriage. The front slide may be moved in and out by hand for the turning operation, but it is not necessary to return the front slide to the starting position because the floating arrangement of the hydraulic cylinder automatically compensates for any relative change in front and rear cylinders.

The invention may be applied to other operations such as automatic recessing in boring operations and any automatic cycle which requires two different locking or starting points. A second hydraulic cylinder might be used in place of the screw and nut with hand wheel. By a combination of these two cylinders, four different positions of the two slides in relation to each other may be obtained in an automatic cycle.

At the rear end of the bed and adjacent the tailstock is a carriage 22a similar to the carriage 22 for burnishing or turning the journal 16 which is adjacent the tailstock. The carriage 22a however, is preferably moved horizontally by means of a cylinder 90 mounted on the tailstock 13. Within cylinder 90 is a piston 91 connected by a piston rod 92 to the carriage 22a. With such construction, movement of the tailstock 13 into engagement with a work piece will automatically move the carriage 22a therewith.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawing is to be interpreted as illustrative and not in a limiting sense.

Having thus described my invention, I claim as new and desire to secure by Letters Patent:

1. In a machine of the character described, a bed, a carriage slidably mounted on said bed for longitudinal movement, front and rear cross slides on the carriage, a cylinder attached to the rear cross slide, a piston within said cylinder, a piston rod attached to said piston, means to connect the front cross slide to said piston rod, said carriage being formed with a through opening, said piston rod passing through said opening, and means to key said piston rod to said carriage.

2. In a machine of the character described, a bed, means to support a work piece above the bed and longitudinally thereof, a carriage slidably mounted on the bed for longitudinal movement, said carriage being formed with a through opening, a piston rod extending through said opening, means to spline said piston rod to said carriage, a piston on said piston rod, a rear cross slide having a portion formed with an opening through which said piston rod extends, a cylinder attached to said rear cross slide, and receiving said piston, a front cross slide having an opening receiving said piston rod, and means for attaching said front cross slide to said piston rod.

3. In a machine of the character described, a bed, means to support a work piece above the bed and longitudinally thereof, a carriage slidably mounted on the bed for longitudinal movement, said carriage being formed with a through opening, a piston rod extending through said opening, means to spline said piston rod to said carriage, a piston on said rod, a rear cross slide having a portion formed with an opening through which said piston rod extends, a cylinder attached to said rear cross slide, and receiving said piston, a front cross slide having an opening receiving said piston rod, and means for attaching said front cross slide to said piston rod, said means comprising a nut rotatably and non-slidably mounted on said front cross slide and having screw threaded engagement with said piston rod.

4. In a machine of the character described, a bed, means to support a work piece above the bed and longitudinally thereof, a carriage slidably mounted on the bed for longitudinal movement, said carriage being formed with a through opening, a piston rod extending through said opening, means to spline said piston rod to said carriage, a piston on said piston rod, a rear cross slide having a portion formed with an opening through which said piston rod extends, a cylinder attached to said rear cross slide, and receiving said piston, a front cross slide having an opening receiving said piston rod, means for attaching said front cross slide to said piston rod, said means comprising a nut rotatably and non-slidably mounted on said front cross slide and having screw threaded engagement with said piston rod, and a hand wheel on said nut for rotating the same.

5. In a machine, a bed, a carriage slidably mounted on the bed for longitudinal movement, a piston rod slidably and non-rotatably connected to said said carriage and extending transversely thereof, a piston on said piston rod, a rear cross slide slidable on said carriage, a cylinder fixed on said cross slide receiving said piston, means on said cross slide to abut a portion of the carriage upon moving said rear cross slide rearwardly, means on the piston rod to abut a portion of the carriage upon moving said piston rod forwardly, and a front cross slide slidable on said carriage and connected to said piston rod.

6. In a machine, a bed, a carriage slidably mounted on the bed for longitudinal movement, a piston rod slidably and non-rotatably connected to said carriage and extending transversely thereof, a piston on said piston rod, a rear cross slide slidable on said carriage, a cylinder fixed on said cross slide receiving said piston, means on said cross slide to abut a portion of the carriage upon moving said rear cross slide rearwardly, means on the piston rod to abut a portion of the carriage upon moving said piston rod forwardly, and a front cross slide slidable on said carriage and connected to said piston rod, and means to cause sliding movement of the front cross slide relative to the piston rod.

7. In a machine, a bed, a carriage slidably mounted on the bed for longitudinal movement, a piston rod slidably and non-rotatably connected to said carriage and extending transversely thereof, a piston on said piston rod, a rear cross slide slidable on said carriage, a cylinder fixed on said cross slide receiving said piston, means on said cross slide to abut a portion of the carriage upon moving said rear cross slide rearwardly, means on the piston rod to abut a portion of the carriage upon moving said piston rod forwardly, and a front cross slide slidable on said carriage and connected to said piston rod, means to cause sliding movement of the front cross slide relative to the piston rod, and burnishing wheels on said cross slides.

8. In a machine of the character described, a bed, a headstock on said bed, a tailstock adjustably mounted on said bed, said headstock and tailstock being adapted to support a work piece longitudinally of the bed, a carriage slidably mounted on the bed for longitudinal movement, hydraulic means interconnecting said tailstock and carriage for moving said carriage relative to said tailstock, front and rear cross slides on said carriage and disposed on opposite sides of the work piece, a common hydraulic means interconnecting said cross slides for moving said cross slides toward or away from each other, said last means comprising a cylinder fixed on the rear cross slide, a piston in said cylinder, a piston rod fixed to said piston and being slidably and non-rotatably connected to said carriage, and means to connect the front cross slide to said piston rod.

9. In a machine of the character described, a bed, a headstock on said bed, a tailstock adjustably mounted on said bed, said headstock and tailstock being adapted to support a work piece longitudinally of the bed, a carriage slidably mounted on the bed for longitudinal movement, hydraulic means interconnecting said tailstock and carriage for moving said carriage relative to said tailstock, front and rear cross slides on said carriage and disposed on opposite sides of the work piece, hydraulic means for moving said cross slides toward or away from each other, said last means comprising a cylinder on the rear cross slide, a piston in said cylinder, a piston rod fixed to said piston and being slidably and non-rotatably connected to said carriage, and means to connect the front cross slide to said piston rod, said last means comprising manual means for adjustably moving said front cross slide relative to said piston rod.

ROBERT KURZWEIL.

REFERENCES CITED

The following references are of record in the file of this patent:

UNITED STATES PATENTS

| Number | Name | Date |
|---|---|---|
| 979,551 | Olson | Dec. 27, 1910 |
| 1,334,335 | Warren et al. | Mar. 23, 1920 |
| 1,400,801 | Cohen | Dec. 20, 1921 |
| 1,876,900 | Fobert et al. | Sept. 13, 1932 |
| 1,920,209 | Norton | Aug. 1, 1933 |
| 1,972,595 | Libby | Sept. 4, 1934 |
| 2,008,012 | Foster | July 16, 1935 |
| 2,062,699 | Christman | Dec. 1, 1936 |
| 2,071,786 | Ferris et al. | Feb. 23, 1937 |
| 2,168,162 | Jackson | Aug. 1, 1939 |
| 2,238,019 | Floater | Apr. 8, 1941 |